United States Patent
Chandramohan et al.

(10) Patent No.: US 6,421,635 B1
(45) Date of Patent: Jul. 16, 2002

(54) METHOD AND APPARATUS FOR HANDLING ASYNCHRONOUS SIGNALS WHILE EMULATING SYSTEM CALLS

(75) Inventors: Bharath Chandramohan, San Clara; Rupert Brauch, Palo Alto; David A. Dunn, San Jose, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/184,845

(22) Filed: Nov. 2, 1998

(51) Int. Cl.⁷ .............................. G06F 9/45
(52) U.S. Cl. ........................... 703/26; 703/23
(58) Field of Search .............. 703/26, 23, 27, 703/28; 714/15, 16, 17, 28, 48, 49, 50, 51

(56) References Cited

U.S. PATENT DOCUMENTS

| | | | | |
|---|---|---|---|---|
| 4,974,159 A | * | 11/1990 | Hargrove et al. | 395/500 |
| 5,481,684 A | * | 1/1996 | Richter et al. | 395/500 |
| 5,481,693 A | * | 1/1996 | Blomgren et al. | 395/500 |
| 5,625,788 A | * | 4/1997 | Boggs et al. | 395/390 |
| 5,664,098 A | * | 9/1997 | Bianchi et al. | 395/527 |
| 5,721,876 A | * | 2/1998 | Yu et al. | 395/500 |
| 5,764,962 A | * | 6/1998 | Buzbee | 703/23 |
| 5,781,750 A | * | 7/1998 | Blomgren et al. | 395/500 |
| 5,784,638 A | * | 7/1998 | Goetz et al. | 395/500 |
| 5,909,567 A | * | 6/1999 | Novak et al. | 712/208 |
| 5,958,054 A | * | 9/1999 | O'Connor et al. | 713/300 |
| 5,964,890 A | * | 10/1999 | Inui et al. | 714/28 |

OTHER PUBLICATIONS

Auder et al.; Implementing fault injection and tolerance mechanisms in multiprocessor systems; IEEE Int. Symp. Defect and Fault Tolerance in VLSI Systems; pp. 310–317, 1996.*

* cited by examiner

*Primary Examiner*—Kevin J. Teska
*Assistant Examiner*—William Thomson

(57) ABSTRACT

The invention determines whether any asynchronous signals are pending and then delivers any such pending signals to the emulated application before the control is transferred to the operating system. A first mechanism sets a global flag, and checks to determine if any signals are pending. If there are pending signals, the emulator halts the emulation of the system call, and delivers the signal to the emulated application. A second mechanism handles signals that arrive after the first mechanism has performed its check. This mechanism checks to see if the global flag is set when a signal arrives. If the flag is set, then the signal is delivered immediately. If the flag is not set, then the signal is deferred. A third mechanism establishes a watch state at the beginning of the emulation, which would be changed by any action of the operating system. When a signal comes in, the emulator checks the watch state. If it does not exist, then the emulator defers the system call.

27 Claims, 2 Drawing Sheets

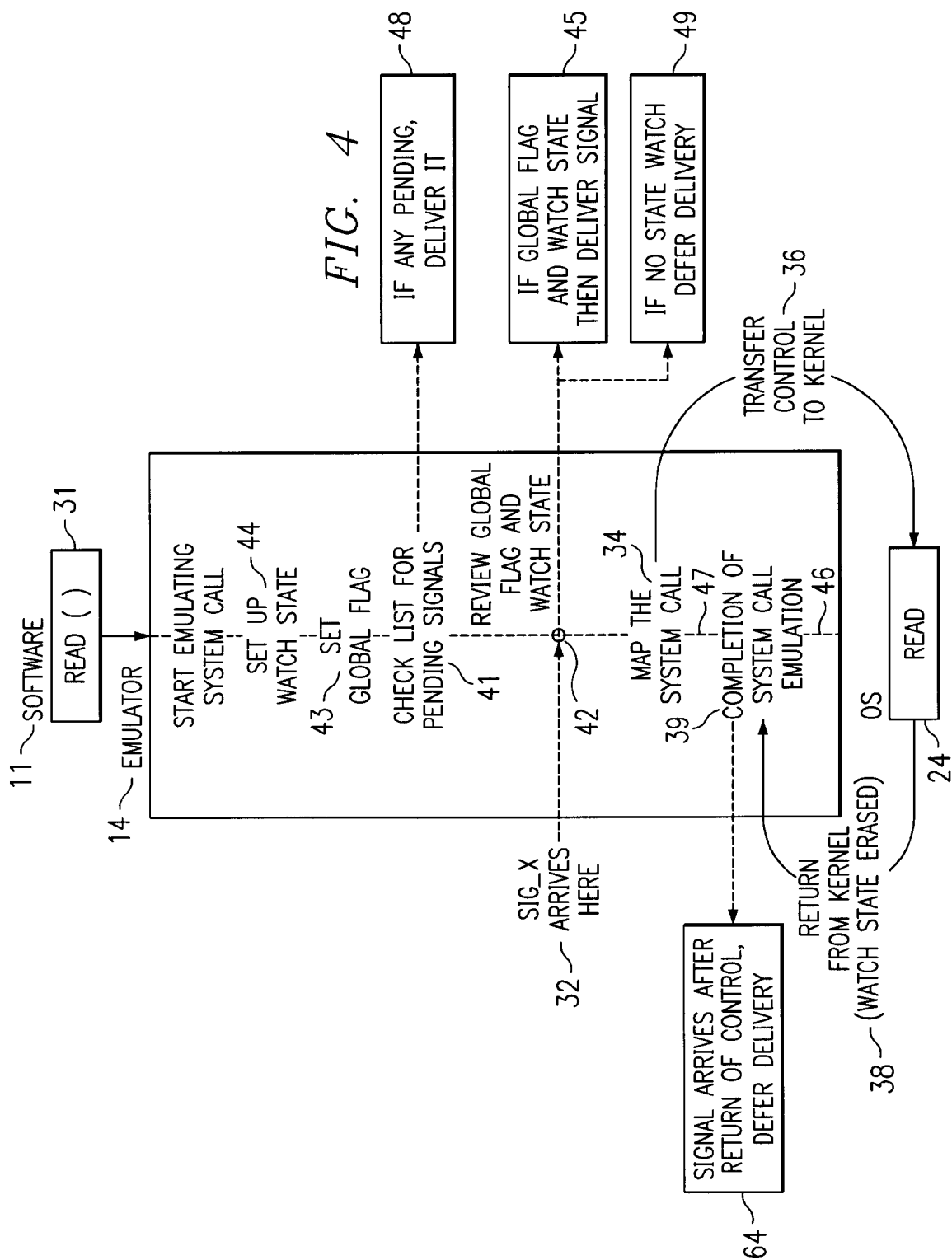

METHOD AND APPARATUS FOR HANDLING ASYNCHRONOUS SIGNALS WHILE EMULATING SYSTEM CALLS

TECHNICAL FIELD OF THE INVENTION

This application relates in general to computer systems utilizing an emulator, and in specific to mechanism for handling signals during the emulation of system calls.

BACKGROUND OF THE INVENTION

Software applications utilize the functionality provided by the underlying operating system during execution time. As shown in FIG. 2, the functionality, such as manipulating files, shared memory, and semaphores, is usually provided in libraries 22 along with an application program interface (API) 21. The operating system 24 implements most of this functionality internally by means of a set of system calls 25. The interface between the libraries and the system calls in the operating system is provided by an application binary interface (ABI) 23. Thus, a software application 11 will make system calls 25 to the operating system 24, via the API interface 21 with the libraries 22 and the ABI interface 23 with the operating system.

Most software applications are developed to operate on one particular type of platform, and thus will not directly run on a different type of platform. A variety of mechanisms have been developed to allow software applications to run on different platforms. One particular mechanism is an emulator which emulates the software application on a different platform from that which it was developed to run. For example, FIG. 1 depicts software application 'A' 11 which was developed to run on platform '1' 12. Application 'A' 11 cannot run on a different type of platform, platform '2' 13, unless emulator 14 emulates the code of software application 11 for use on platform '2' 13. Emulators are also used in testing and prototyping software applications.

Emulators 14 are typically software mechanisms which are resident in the second platforms, i.e. platform '2' 13. The emulator exactly reproduces the operating environment expected by the software application. The emulator does this by emulating both the instruction set architecture (ISA) of the platform, which refers to the machine instructions in the software, and the environment, which refers to the system calls, signals, etc. used by the software. Part of the environment emulation involves emulating the signals and the system calls provided by the operating system which ordinarily would be directly visible to the software application.

A problem occurs during the emulation of the system calls, particularly with signals which occur during the emulation. Signals are mechanisms provided by the operating system to notify processes or software applications about events that have occurred. Signals are usually classified into synchronous or asynchronous. Synchronous signals are caused by the execution of the software application, and thus, are delivered immediately, at well defined points in the emulated application program code. Asynchronous signals are caused externally and are not delivered at any precise location, i.e., the delivery location is indeterminate. Thus, asynchronous signals need not necessarily be delivered immediately after they occur. Moreover, an emulator may need to delay delivery of asynchronous signals because the emulated application may not be in a state consistent with the arrival of the signal when the signal arrives. Consequently, asynchronous signals are deferred until the emulated application 11 is in a proper state to receive such a signal.

A system call is a mechanism that transfers control from the software application to a specified functionality of the operating system of the platform. The emulator can emulate most system calls made by the emulated software application by mapping them onto the system calls provided by the operating system of the second platform, i.e. platform '2' 13. A system call may be interrupted by an asynchronous signal.

A problem would occur if a signal were deferred during the emulation of a system call. The signal would not be delivered until the emulation of the system call was completed, which is when the emulated application is in a proper state to receive such a signal. In order to emulate the system call, the emulator makes a corresponding system call to the native operating system. The native system call will block whenever the corresponding system call would have blocked on the legacy system. If the emulated application is relying on the fact that a blocked system call will be interrupted by a signal, the application will not function correctly under the emulator, since the deferred signal would no longer be able to interrupt the system call, and the system call will block forever.

FIG. 3 depicts an example of the problem occurring during the emulation of system calls. Software application 11 makes a system call, read( ) 31, with the assumption that a signal, SIG_X 32, will interrupt the system call and thereby cause control to return to the application. As shown in FIG. 3, the signal SIG_X 32 occurs after emulation 33 of the read( ) 31 has commenced and before the system call has been mapped 34 to an equivalent system call in the second platform, platform '2' 13. After mapping, control is transferred 36 to the kernel of the operating system 24. If the emulator defers SIG_X for later delivery 35 instead of immediate delivery, then the read( ) system call will block or hang indefinitely because it is waiting for SIG_X to interrupt it, which can no longer interrupt it because it has already been deferred. Thus, the operating system is waiting for the signal 37 before returning to the emulator 38, and completing the system call 39. Note that emulator 14 performs additional steps during emulation of the system call which are depicted by . . . characters in FIG. 3. These steps will vary, depending upon the specific system call being emulated, and thus are not shown here.

Therefore, there is a need in the art for a mechanism which will deliver any asynchronous signals that either arrive or are pending during the emulation of system calls.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 depicts the use of the watch state mechanism, the signal mechanism, and the check mechanism of the invention during the emulation of a system call.

SUMMARY OF THE INVENTION

Figure 2:
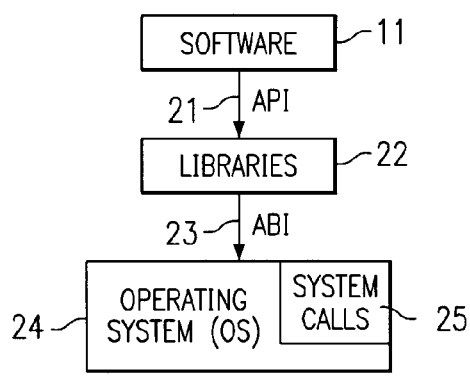
FIG. 2 depicts the interaction of the software application with the operating system of a platform.
Figure 1:
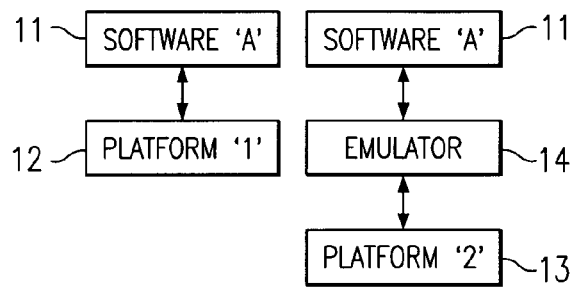
FIG. 1 depicts a software application running on a first platform and on a second platform via an emulator.
Figure 3:
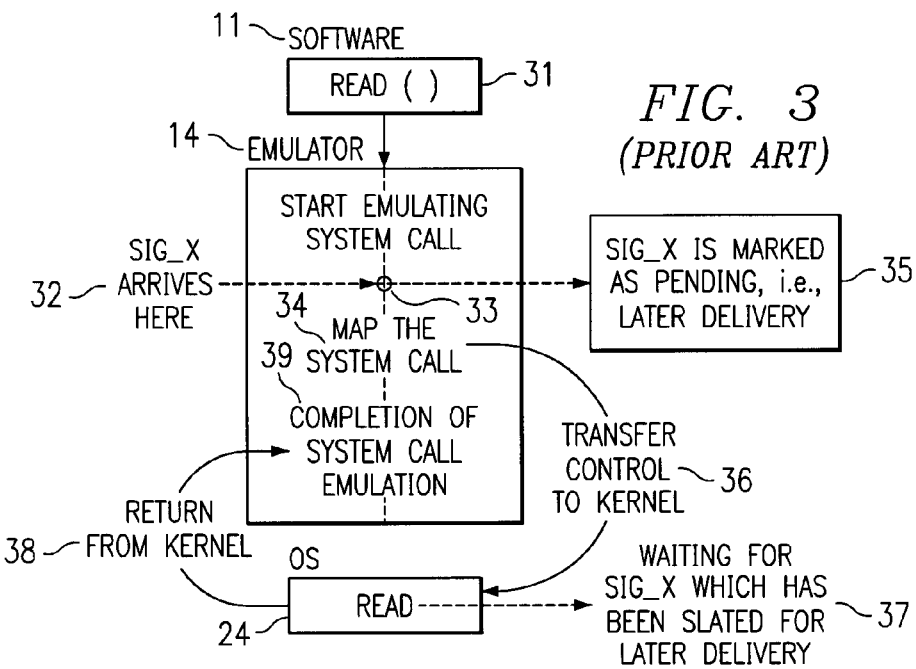
FIG. 3 depicts the emulation of a system call on a prior art emulator.

These and other objects, features and technical advantages are achieved by a system and method which utilizes these mechanisms for determining whether asynchronous signals are pending and then delivering any such signals to the emulated application before the emulated system call is mapped to the operating system (i.e., control is transferred to the operating system). The first and second mechanisms cooperate to eliminate the race condition that would cause the hung up state to occur. A third mechanism allows the emulator to determine whether a signal has arrived before or after the system call has been made to the operating system.

The first mechanism operates at the time an interruptible system call is made. The first mechanism of the emulator sets a global flag to indicate that it is about to make an interruptible system call. It then checks the list of pending signals to determine if any signals are pending. If there are pending signals, the emulator halts the emulation of the system call, and delivers the signal to the emulated application. These operations should be performed in this order so that the two mechanisms can cooperate properly. Thus, the emulator manipulates the emulated state to make it appear that the system call has not yet been made. Thus, when the signal is delivered to the emulated application, it seems that the signal arrived just before the ABI call was made.

A second mechanism cooperates with the first mechanism to prevent the hung up state. This mechanism operates at the time a signal is delivered to the emulator. The second mechanism of the emulator checks to see if the global flag that is set by the first component. If the flag is set, then the signal is delivered to the application immediately. Again, the emulator manipulates the emulated state so that it appears that the system call has not yet been made. If the global flag is not set, the emulator defers the signal for later delivery. In order for the two components to cooperate properly, the operations of testing/setting the flag and setting/testing the pending signal list must be performed in the correct order, The first mechanism must set the global flag before checking for pending signals. The second mechanism must add the signal to the pending signal list before it checks the global flag.

A third mechanism allows the second mechanism to determine whether the signal has arrived before or after the system call has been made. The third mechanism establishes a watch state at the beginning of the emulation, which would be changed by the completion or interruption of the system call. If the second mechanism determines that the emulator is in the middle of processing a system call when the signal arrives, the second mechanism checks to see if the watch state still exists. If the watch state exists, the system call has not yet been made, and the emulator should deliver the signal to the emulated application. Again the emulated application believes that the system call has not yet been performed. If the watch state no longer exists, the system call has been completed, and it is safe to defer delivery of the signal. If the signal interrupted the native system call made by the emulator on behalf of the emulated application, the emulator detects this fact, and does not use the third mechanism. Instead, it delivers the signal immediately, and marks the signal as having interrupted a system call. Note that the watch state is set prior to the setting of the global flag, otherwise the second mechanism may see that the global flag has been set and the watch does not exist, and may mistakenly believe that the system call has been completed, when the system call has not started yet.

These three mechanisms ensure that no matter when the signal arrives, the emulator will behave correctly. If the signal arrives before the first mechanism has set the global flag, it will be added to the list of pending signals. The first mechanism will see that there is a pending signal, and deliver the signal before making the system call. If the signal arrives after the first mechanism has set the global flag, but before the native system call has been made, the second mechanism will see that the flag has been set, and that the watch state still exists. The emulator will deliver the signal to the emulated application immediately rather than deferring it. If the signal arrives during processing of the native system call, the operating system will mark the signal as having interrupted a system call. The emulator will deliver the signal immediately. If the signal arrives after the system call has returned, the emulator will detect that the watch state no longer exists, since it has been eliminated by the system call's completion. The signal will be deferred.

It is a technical advantage of the present invention that asynchronous signals are delivered to the emulated application during the emulation of system calls made by the application.

It is another technical advantage of the present invention that the emulator and the emulated application will not enter into a hung up state because of an undelivered asynchronous signal.

It is a further technical advantage of the present invention that the pending signals of the platform are examined by a check mechanism prior to the mapping of the emulated system call to the operating system.

It is a still further technical advantage of the present invention that a watch state is implemented to check for signals that arrive during emulation of a system call.

It is a still further technical advantage of the present invention that a watch state is selected from states that do not indicate a success state, or a failure state, of the system call.

It is a still further technical advantage of the present invention that completion or interruption of the system call will eliminate the watch state.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE PREFERRED EMBODIMENTS

FIG. 4 depicts the three inventive mechanisms of the emulator. The first mechanism is invoked whenever the emulator emulates an interruptible system call, At the start of emulation of an interruptible system call, the first mechanism or check mechanism, sets global flag 43. The global flag 43 indicates that the emulator is currently processing an interruptible system call, and thus is vulnerable to becoming hung up, as described earlier. Note that flag is cleared after the native system call returns, which indicates that the emulator is not vulnerable to entering the hung up state.

The first mechanism then checks for pending signals 41 Note than any signal which arrives prior to the start of the system call or prior to setting the global flag, is marked as pending, which indicates that the emulator should deliver the signal later. The check mechanism 41 is invoked to review the list of pending signals. This check is performed prior to mapping 34 of the emulated call to the operating system 24. If the emulator 14 has a signal pending, then it will deliver it 48 to the emulated application 11, before it emulates the system call and transfers control 36 to the operating system. Note that the list of pending signals is maintained by the emulator. Further note that each system call has a "handler" that does the work necessary to emulate the system call. That work usually includes making a corresponding native system call. Note that it is possible for multiple system calls to have the same routine as a handler. If a particular system call can be interrupted, then the handler for that system call will contain code to set the global flag before making the system call, check the list of pending signals, make the native system call, and then clear the global flag after the system call has returned. If a system call can never be interrupted, then the handler will not contain code to set/clear the global flag or check the list of pending signals.

If the emulator delivers the signal to the emulated application at this point, it will appear to the emulated application that the application binary interface (ABI) call or system call has not yet been made. Unless the emulated application's signal handler takes some special action, when the emulated application's signal handler returns, the emulated state will indicate that the application is about to make an ABI call. The emulator will therefore restart emulation of the system call.

The second mechanism or signal mechanism 42 operates when a signal 32 is delivered to the emulator. The second mechanism checks to see if the global flag has been set by the first mechanism 45. If the flag is set, the emulator delivers the signal to the application 11 immediately. Again, the emulated state indicates that the ABI call has not yet been made, so it appears to the emulated application that the system call has not yet been made. If the global flag is not set, the emulator defers the signal for later delivery 49.

Note that the second mechanism requires the knowledge of when the signal has arrived, i.e. before control has been transferred to the operating system or after control has been returned to the emulator. If control has been returned to the emulator, then the signal should not be delivered immediately, as the operating system has completed processing of the system call. If control has not yet been transferred, then the signal should be delivered and not marked as pending, since the pending signals list has already been checked 41. In order to ensure appropriate behavior, the third mechanism of emulator, or watch state mechanism, sets up a watch state 51.

Communications between the operating system and the application or emulator occurs via registers. Specifically, the values for various functions are passed to the operating system by registers, and the operating system returns values by placing them back into the registers. These registers may be the same or different from the registers used to pass information to the operating system. The values that are returned by the operating system are discrete and known, i.e. there are particular values or states for successful system calls and for failed system calls. The values passed to the operating system or pass states are also discreet and known. A watch state is state which is neither a success state, a failure state, or a pass state. Thus, if a watch state is set in the return registers, an interruption or completion of the system call will change the state of the registers, and the change will not be to a watch state. Note that success and failure states indicate whether the system call was a success or failure. This information is need by the emulated application to determine the subsequent course of action of the application. Further note that state refers to the machine state which includes registers, program counters, etc. For example, a watch state may use the argument registers such as % r26, % r25, % r24 and % r23 on HP-UX, and return registers such as % r28 and % r29 on HP-UX. The watch state would be values which are never used together.

Consequently, as the emulator 14 starts the emulation of the system call, the third mechanism or watch state mechanism sets up the watch state 44. When a signal 32 arrives, the second mechanism of the emulator 14 checks to see if the global flag has been set. If the flag has been set, then the second mechanism checks the watch state to determine the state of the emulation of the system call. The emulator performs this second check by looking at the watch state, which has been set at a specific register, program counter or set of registers, or other locations. If the watch state exists, meaning that the operating system has not modified the registers, then the emulator will halt the emulation of the system call and send the signal to the emulated application. Thus, during emulation of the system call, an asynchronous signal will be correctly delivered to the emulated application.

The invention as shown in FIG. 4 will correctly handle a signal arriving at point 46, which is after control has been returned from the operating system 38. In this instance, the operating system would have modified the registers in some manner to indicate either the success or failure of the system call, and thus the watch state would no longer exist. Thus, the signal would not be immediately delivered to the emulated application, but would be deferred for later delivery 64. Note that the watch state is changed by the operating system by returning some value in one of the return registers, for example % r28 on HP-UX. Since the watch state no longer exists, the check for its existence would fail, and the emulator would avoid the delivery of the signal at that point. Note that the global flag 43 is reset or cleared by the system call handler after the native system call has returned. As the watch state is being checked, this means that the global flag has not yet been cleared. Thus, the signal arrived after the system call returned, but before the flag was cleared. This is an interval of only a few machine instructions, but it is still a vulnerability that must be addressed.

The invention as shown in FIG. 4 will correctly handle a signal arriving at point 47, which is after the system call has been mapped to the operating system 34, but before control has been returned from the operating system 38, in other words, the operating system is processing the system call. If the emulator receives a signal from the operating system at this point, then the emulator knows that the native system call was interrupted. In this case, the operating system has stopped its own processing, and sent the signal to the emulator. The emulator then sends the signal to the application, indicating the interruption of the system call. Note that this situation duplicates what would happen natively, i.e. without the emulator. The operating system would send a signal back to the application during the processing of a system call, indicating the interrupting of the processing.

Figure 5:
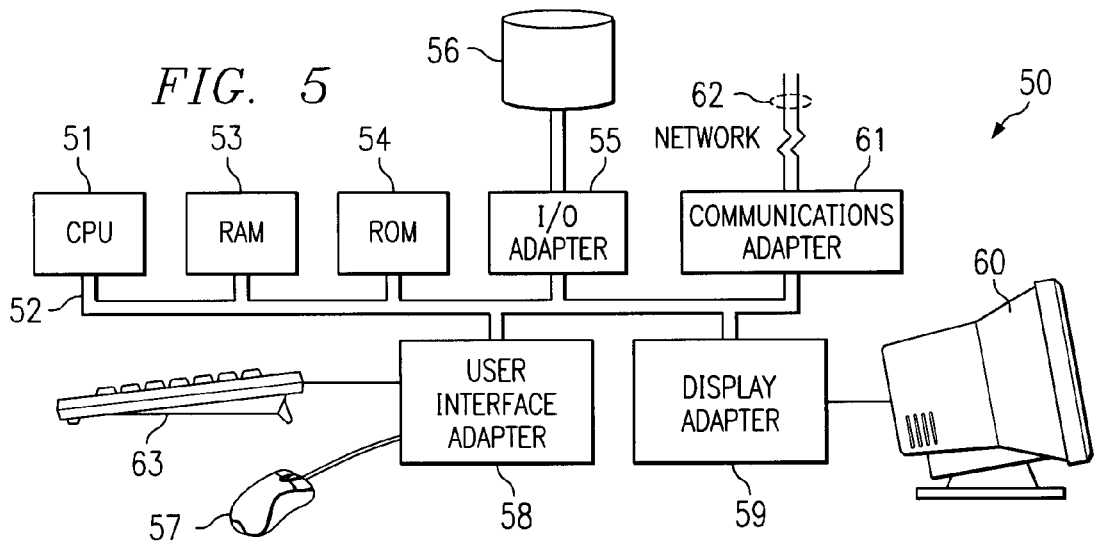
FIG. 5 depicts a high level block diagram of a computer system adapted to implement the present invention.

FIG. 5 illustrates a computer system 50 adapted to use the present invention. Central processing unit (CPU) 51 is coupled to bus 52. In addition, bus 52 is coupled to random access memory (RAM) 53, read only memory (ROM) 54, input/output (I/O) adapter 55, communications adapter 61, user interface adapter 58, and display adapter 59.

RAM 53 and ROM 54 hold user and system data and programs as is well known in the art. I/O adapter 55 connects storage devices, such as hard drive 56, to the computer system. Conmmunications adaption 61 is adapted to couple the computer system to a local, wide-area, or Internet network 62. User interface adapter 58 couples user input devices, such as keyboard 63 and pointing device 57, to the computer system 50. Finally, display adapter 59 is driven by CPU 51 to control the display on display device 60. CPU 51 may be any general purpose CPU, such as a HP PA-8200. However, the present invention is not restricted by the architecture of CPU 51 as long as CPU 51 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. An apparatus for managing at least one signal during an emulation of a system call, wherein an emulator is emulating an application to operate on an operating system, the operating system is resident on a computer system, the emulator includes a list identifying deferred signals, and the computer system includes a register through which the application and the operating system communicate, the apparatus comprising:

a first check mechanism that sets a global flag which indicates that the emulator is commencing an interruptible system call, and reviews the list prior to completion of the emulation of the system call to determine whether the at least one signal is identified therein;

a delivery mechanism which operates if the first check mechanism has determined that the at least one signal is on the list, the delivery mechanism delivers the at least one stored signal to the application prior to completion of the emulation of the system call;

a state mechanism which sets a watch state in the register during the emulation of the system call, wherein the watch state indicates whether control has been transferred from the operating system to the emulator after processing the emulated system call; and a second check mechanism which reviews the watch state and the global flag upon an arrival of the at least one signal, wherein the delivery mechanism delivers the at least one signal to the application prior to completion of the emulation of the system call, if the watch state is present and the global flag is set.

2. The apparatus of claim 1, wherein:

the at least one signal is an asynchronous signal which is intended to interrupt an operation of the system call on the operating system.

3. The apparatus of claim 1, wherein:

the first check mechanism operates prior to the second check mechanism.

4. The apparatus of claim 1, wherein:

the first check mechanism, the delivery mechanism, the state mechanism, and the second check mechanism are components of the emulator.

5. The apparatus of claim 1, wherein:

if the first check mechanism determines that the list identifies the at least one signal, then emulator ceases the emulation of the system call prior to transfer of the emulated system call to the operating system.

6. The apparatus of claim 1, wherein:

if the first check mechanism determines that the list does not identify the at least one signal, then emulator will continue with the emulation of the system call for transfer to the operating system.

7. The apparatus of claim 1, wherein:

the watch state is a state which is not used by the operating system, such that any system call communication from the operating system erases the watch state.

8. The apparatus of claim 1, wherein:

the watch state is a state which is not used in system call communications between the operating system and the application.

9. The apparatus of claim 1, wherein:

the watch state is set at the beginning of the emulation of the system call.

10. The apparatus of claim 1, wherein:

the watch state is set prior to the operation of the first check mechanism.

11. The apparatus of claim 1, wherein:

if the second check mechanism determines, subsequent to the operation of the first check mechanism, that the watch state does not exist, then emulator defers the at least one signal for later delivery.

12. The apparatus of claim 1, wherein:

if the second check mechanism determines, subsequent to the operation of the first check mechanism, that the watch state exists, then emulator ceases the emulation of the system call prior to transfer of the emulated system call to the operating system.

13. The apparatus of claim 1, wherein:

a return of control from the operating system to the emulator will cause the watch state to be erased.

14. The apparatus of claim 13, wherein:

any signals arriving after the return of control are deferred for later delivery.

15. A method for managing at least one signal during an emulation of a system call, wherein an emulator is emulating an application to operate on an operating system, the operating system is resident on a computer system, the emulator includes a list identifying deferred signals and the computer system includes a register through which the application and the operating system communicate, the method comprising the steps of:

setting a global flag which indicates that the emulator is commencing an interruptible system call, reviewing the list prior to completion of the emulation of the system call to determine whether the at least one signal is identified therein;

delivering the at least one signal to the application, prior to completion of the emulation of the system call, if the at least one signal is on the list;

setting a watch state in the register during the emulation of the system call; wherein the watch state indicates whether control has been transferred from the operating system to the emulator after processing the emulated system call;

reviewing the watch state and the global flag upon an arrival of the at least one signal; and delivering the at least one signal to the application prior to completion of the emulation of the system call, if the watch state is present and the global flag is set.

16. The method of claim 15, wherein:

the at least one signal is an asynchronous signal which is intended to interrupt an operation of the system call on the operating system.

17. The method of claim 15, wherein:
the step of reviewing the list occurs prior to the step of reviewing the watch state and the global flag.

18. The method of claim 15, wherein the step of reviewing the list has determined that the list identifies the at least one signal, the method further comprises the step of:
ceasing the emulation of the system call prior to transfer of the emulated system call to the operating system.

19. The method of claim 15, wherein the step of reviewing the list has determined that the list does not identify the at least one signal, the method further comprises the step of:
continuing emulation of the system call for transfer to the operating system.

20. The method of claim 15, wherein:
the watch state is a state which is not used by the operating system, such that any system call communication from the operating system erases the watch state.

21. The method of claim 15, wherein:
the watch state is a state which is not used in system call communications between the operating system and the application.

22. The method of claim 15, wherein:
the step of setting the watch state is performed at the beginning of the emulation of the system call.

23. The method of claim 15, wherein:
the step of setting the watch state is performed prior to the step of reviewing the list.

24. The method of claim 15, wherein the step of reviewing the watch state has determined that the watch state exists and the step of reviewing the list has been performed, the method further comprises the step of:
ceasing the emulation of the system call prior to transfer of the emulated system call to the operating system.

25. The method of claim 15, wherein:
a return of control from the operating system to the emulator will cause the watch state to be erased.

26. The method of claim 15, wherein a signal has arrived after the return of control, the method further comprising the step of:
deferring the signal for later delivery.

27. A computer program product having a computer readable medium having computer program logic recorded thereon for managing at least one signal during an emulation of a system call, wherein an emulator is emulating an application to operate on an operating system, the operating system is resident on a computer system, the emulator includes a list identifying deferred signals and the computer system includes a register through which the application and the operating system communicate, the computer program product comprising:

means for setting a global flag which indicates that the emulator is commencing an interruptible system call, means for reviewing the list prior to completion of the emulation of the system call to determine whether the at least one signal is identified therein;

means for delivering the at least one signal to the application, prior to completion of the emulation of the system call, if the at least one signal is on the list;

means for setting a watch state in the register during the emulation of the system call; wherein the watch state indicates whether control has been transferred from the operating system to the emulator after processing the emulated system call;

means for reviewing the watch state and the global flag upon an arrival of the at least one signal; and means for delivering the at least one signal to the application prior to completion of the emulation of the system call, if the watch state is present and the global flag is set.

* * * * *

UNITED STATES PATENT AND TRADEMARK OFFICE
CERTIFICATE OF CORRECTION

PATENT NO. : 6,421,635 B1
DATED : July 16, 2002
INVENTOR(S) : Bharath Chandramohan et al.

It is certified that error appears in the above-identified patent and that said Letters Patent is hereby corrected as shown below:

Column 10,
Line 1, delete "15" and insert -- 25 -- therefor.

Signed and Sealed this

Eighth Day of April, 2003

JAMES E. ROGAN
*Director of the United States Patent and Trademark Office*